June 30, 1964 L. F. BENDER 3,139,107
FLUID HANDLING APPARATUS FOR MILK PIPELINE WASHING SYSTEM
Filed April 24, 1963 2 Sheets-Sheet 1
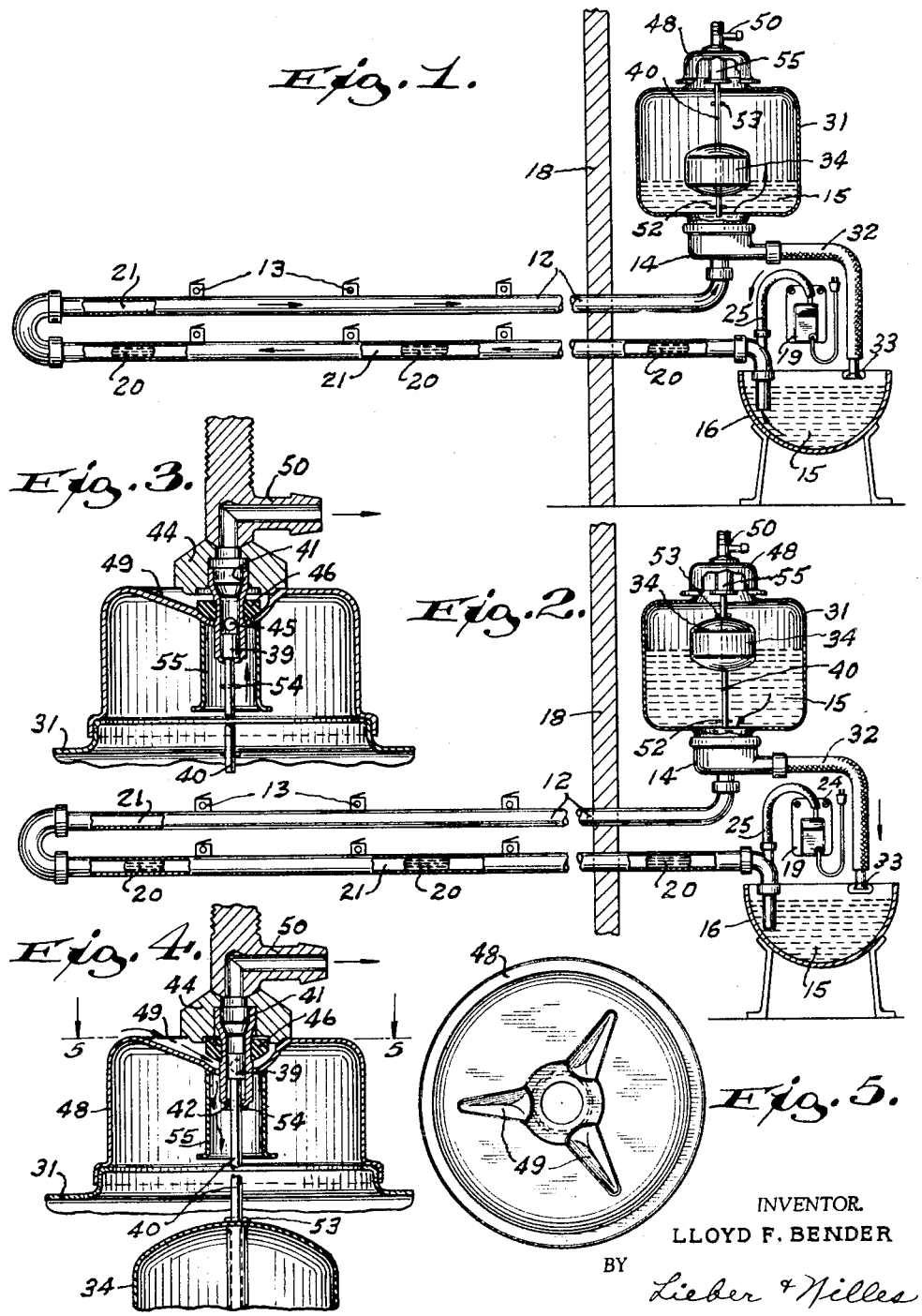
INVENTOR.
LLOYD F. BENDER
BY Lieber & Nilles
ATTORNEYS.

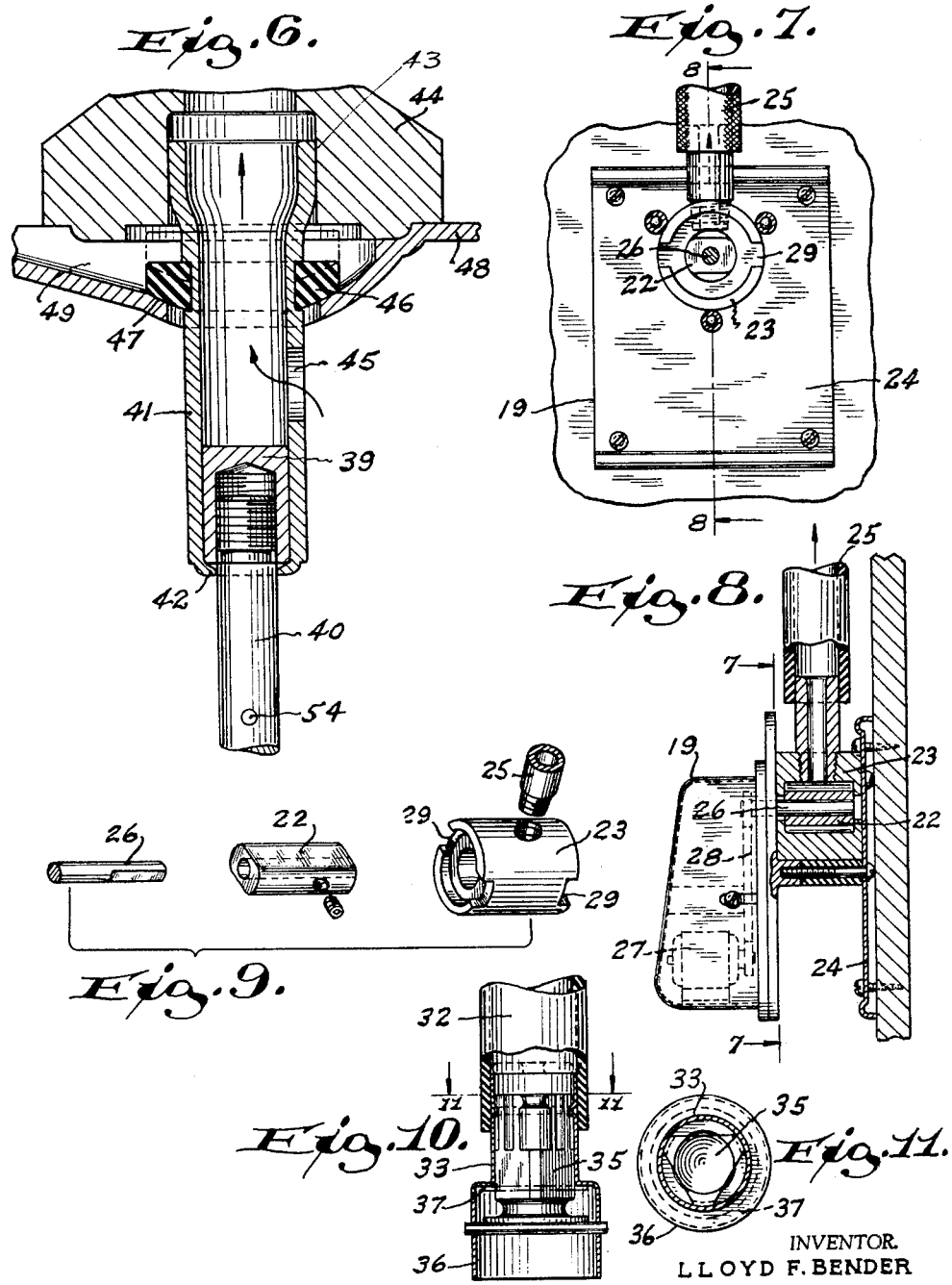

United States Patent Office

3,139,107
Patented June 30, 1964

3,139,107
FLUID HANDLING APPARATUS FOR MILK PIPELINE WASHING SYSTEM
Lloyd F. Bender, Hayward, Wis.
Filed Apr. 24, 1963, Ser. No. 275,333
4 Claims. (Cl. 137—389)

The present invention relates to improvements in the art of cleansing milk conducting lines and other equipment in dairies or the like, and it relates more particularly to an improved fluid handling apparatus for washing the main milk collecting and transporting pipelines of such installations.

The primary object of this invention is to provide a highly efficient apparatus for automatically washing and sterilizing elongated milk conducting lines with the aid of simplified equipment.

It has long been customary to cleanse dairy equipment including the milk conducting lines with which the teat cups are normally associated, with the aid of so-called pipeline washers of the general type comprising a transparent reservoir having a valve at its top operable by a float confined and adapted to ride upon the cleansing liquid within the reservoir to alternately connect the interior of the latter with a source of vacuum and with the ambient atmosphere and to thereby cause cleansing liquid to flow back and forth from a liquid source through the line. Since these prior systems caused the long milk conducting lines to be substantially filled with cleansing liquid while the reservoirs were subjected to vacuum and were being filled, it required the provision of abundant quantities of cleansing liquid in order to effect thorough washing, and since water supplies are very limited in many localities the use of large quantities of liquid is highly objectionable and costly. Then, too, the valve mechanisms of such prior systems are complicated and require a lot of attention in order to maintain the same in sanitary and effective working condition, thus making them further objectionable.

It is therefore an important more specific object of the present invention to provide an improved apparatus for thoroughly washing and sterilizing the milk conducting pipelines of milking machines with the aid of limited quantities of cleansing solution and water.

Another important object of this invention is to provide an improved apparatus for cleansing a pipeline for milk or the like, by subjecting the interior thereof to a succession of relatively short cleansing liquid slugs separated by much longer air filled spaces, and by advancing the series of spaced liquid slugs with a scouring action through the line at a rapid rate.

A further important object of the invention is to provide an improved milk conveying pipeline washing unit having a cleansing liquid reservoir communicating with one end of the line provided with a simplified float actuated valve for alternately subjecting the reservoir interior with a vacuum source and with the ambient atmosphere, and wherein this valve is cooperable with a timing valve associated with the opposite end of the line operable to alternately connect the latter line end with a source of cleansing liquid and with the ambient atmosphere when the reservoir is being subjected to vacuum.

Still another important object of this invention is to provide various improvements in the construction and operation of apparatus for effectively cleansing milk conducting pipelines and for effecting the transportation of liquid therethrough while in normal use.

These and other more specific objects and advantages of the invention will be apparent from the following detailed description.

A clear conception of the present improved milk line cleansing system, and of one embodiment of apparatus for effecting practical exploitation of the system, may be had by referring to the drawings accompanying and forming a part of this specification wherein the various parts are designated by suitable reference characters.

FIG. 1 is a diagram of the complete system showing the various parts in action as when cleansing liquid slugs are being successively advanced in spaced relation through a milk conducting pipeline;

FIG. 2 is a similar diagram of the same system but showing the parts in action when returning a batch of cleansing liquid from the washing unit to the cleansing liquid supply tank;

FIG. 3 is a somewhat enlarged central vertical section through the improved vacuum actuated control valve associated with the washing unit of the system, showing the position of this valve when cleansing liquid slugs are being admitted to the pipeline as in FIG. 1;

FIG. 4 is a similarly enlarged section through the same vacuum actuated control valve, but showing the position thereof when a batch of cleansing liquid is being returned to the supply tank as in FIG. 2;

FIG. 5 is a likewise enlarged top view of the upper closure cap of the washing unit;

FIG. 6 is a further enlarged central vertical section through the improved float and vacuum actuated control valve of the washing unit;

FIG. 7 is a vertical section through the timing device for alternately admitting cleansing liquid slugs and air to a pipeline during washing operation, the section being taken along the line 7—7 of FIG. 8;

FIG. 8 is a part sectional side elevation of the same timing device, taken along the line 8—8 of FIG. 7;

FIG. 9 is an exploded view of the timer control valve of the device shown in FIGS. 7 and 8;

FIG. 10 is a part sectional side elevation of the check valve for controlling the discharge of accumulated batches of cleansing liquid from the washing unit; and FIG. 11 is a section through the conduit communicating with the valve of FIG. 10, taken along the line 11—11.

While the invention has been shown and described herein as having special utility when employed for the purpose of washing the milk conducting lines in dairies, it is not intended to limit its use to such specific purposes since the improvement may be generally applicable for the purpose of cleansing any liquid conducting pipelines; and it is also contemplated that specific descriptive terms used herein be given the broadest possible interpretation consistent with the disclosure.

In FIGS. 1 and 2 of the drawings which diagrammatically illustrate a system for exploiting the improved method of cleansing dairy equipment, the elongated milk conducting pipeline 12 is provided with a series of teat cup receiving connections 13 and has one end in open communication with a vacuum actuated liquid transporting unit 14 adapted to either convey fresh milk from any source through the line or to transport cleansing liquid therethrough whenever the line is being washed, while the opposite end of the line is either sealed when transporting milk or is immersed within a source of washing and sterilizing liquid 15 confined in a tank 16 during cleansing operations.

The long pipeline 12 may be sixty feet or more in length and extends through and beyond one side of a wall 18 into the cattle housing space containing a series of stalls, while the washing and milk transporting unit 14, the tank 16, and other equipment are located in a room on the opposite side of this wall 18. During washing operations, one end of the pipeline 12 is constantly immersed within the cleansing liquid 15 in the tank 16 while washing of the line is being effected, and the line 12 just beyond this submerged end is provided with an electrically actuated timer 19 adapted to intermittently admit successive slugs 20 of cleansing liquid 15 separated by atmospheric air filled spaces 21 into the pipeline 12 whenever the interior of the washing unit 14 is subjected to vacuum as shown in FIGS. 1 and 2.

The timer 19 is shown in detail in FIGS. 7, 8, and 9, and comprises a valve plug 22 rotatable within a bore formed in a stationary sleeve 23 mounted upon a fixed support 24, and which is adapted to periodically connect the interior of the pipeline 12 with the ambient atmosphere through a conduit 25 and to alternately cut off this air admission and allow this line to receive successive liquid slugs 20 from the liquid basin 15 due to the vacuum in the unit 14. The plug valve 22 is secured to a shaft 26 adapted to be rotated at predetermined speed by an electric motor 27 through speed reducing gearing 28 as shown in FIG. 8, and when this valve 22 is in the position shown in FIGS. 7 and 8, atmospheric air is sucked into the pipeline 12 through notches 29 in the sleeve 23 and through the conduit 25, whereas such air admission is cut off when the valve plug seals the inlet end of the conduit 25.

The vacuum actuated liquid propelling unit 14 is illustrated in FIGS. 1 to 6 inclusive, and comprises a stationary liquid accumulating reservoir 31 having its lower end portion in open communication with the end of the pipeline 12 remote from the timer 19 and also intermittently communicable with the tank 16 through a liquid return pipe 32 past an automatic check valve 33, while its interior is adapted to be alternately exposed to vacuum and to atmospheric pressure by means of an improved valve assemblage associated with the upper end portion of the reservoir 31 and which is responsive to the position of a float 34 riding upon the liquid 15 in this receptacle. The check valve 33 may be of any suitable type adapted to be closed by atmospheric pressure whenever the interior of the reservoir 31 is subjected to vacuum, and as shown in FIG. 10 this check valve 33 has a plunger 35 reciprocable within a fitting 36 secured to the outlet end of the pipe 32 and having therein a seat 37 with which the plunger 35 is cooperable to close the valve.

The improved float responsive valve assemblage for controlling the admission and release of liquid 15 into and from the interior of the reservoir 31 is shown in detail in FIGS. 3, 4, and 6 and comprises a piston 39 secured to the upper end of a vertically reciprocable rod 40 along which the float 34 is movable as it rises and falls due to the admission and discharge of liquid 15 within the reservoir 31; a valve sleeve 41 within which the piston 39 is reciprocable and which is provided with a lower annular end abutment 42 and with an enlarged upper end 43 snugly slidably confined in a bore formed within a clamping block 44 and has a lateral port 45 therein between its ends; and a disk valve 46 secured to the sleeve 41 and being cooperable with a seat 47 formed on a closure cover 48 for the reservoir 31 provided with air admission ducts 49 and which is normally clamped in position by a vacuum connection 50 coacting with the block 44.

The vertically movable float guiding rod 40 is provided with a pair of lower and upper abutments 52, 53, respectively, with which the float 34 is cooperable to reciprocate this rod centrally within the reservoir 31, and the rod 40 is also provided with an upper stop pin 54 adapted to engage the lower valve confining sleeve abutment 42 whenever the piston 39 has been moved upwardly sufficiently to seal the port 45. The lower portion of the piston confining sleeve 41 may be surrounded by a downwardly open apron 55 secured to the cover 48 but which is spaced from this sleeve so as not to obstruct communication of the port 45 with the interior of the reservoir 31 as shown in FIGS. 3 and 4; and the disk valve 46 which is attached to the sleeve 41 is engageable with the bottom of the clamping block 44 to stop the upward movement of this valve and of the sleeve 41. The vacuum connection 50 may be in constant open communication with any suitable source of vacuum, thus completing the improved pipeline cleansing installation.

When the improved milk and liquid conducting equipment has been properly constructed and installed for use in cleansing the pipeline 12, the milk supplying elements 13 should be closed, and the tank 16 should be provided with a relatively small amount of cleansing and sterilizing liquid 15 sufficient to constantly seal the inlet end of the elongated pipeline but not necessarily sufficient to completely fill this long main line 12. With the reservoir 31 substantially empty so that the float 34 rests upon the lower rod abutment 52 and before the reservoir interior is subjected to vacuum, the check valve 33 will be open, but as soon as the vacuum is applied this check valve will be closed by atmospheric pressure, and the timer 19 should be started to cause the plug valve 22 to open and close at predetermined intervals. This plug valve is so formed that the slugs 20 occupy only a fraction of the space occupied by the intervening air filled spaces 21, but the successive slugs 20 will be advanced in the same direction longitudinally through the pipeline 12 whenever the interior of the reservoir 31 is subjected to vacuum and will reciprocate slightly between the adjacent air spaces 21 to subject the entire pipeline interior to a scouring and thorough cleansing action.

The successive cleansing liquid slugs 20 are eventually drawn into the reservoir 31 and cause the liquid 15 to accumulate within this reservoir, thereby lifting the float 34 which rides along the rod 40 until it engages the upper abutment 53. As the liquid 15 continues to build up in the reservoir 31, the float 34 lifts the rod 40 and causes the piston valve 39 carried by the upper rod end to seal the port 45 so as to cut off communication of the reservoir interior with the source of vacuum, and promptly thereafter causes the upper pin 54 of the rising rod 40 to engage the lower annular abutment 42 of the valve sleeve 41, thereby lifting this sleeve and opening the disk valve 46. This opening of the valve 46 permits atmospheric air to enter the reservoir 31 through the ducts 49 and also causes the vacuum acting upon the interior of the sleeve 41 and on the piston 39 to hold the rod 40 in uppermost position while simultaneously opening the check valve 33, thus permitting the accumulated liquid to quickly escape by gravity from within the reservoir through the pipe 32 by gravity.

While the reservoir is thus being drained, the pipeline 12 will be subjected to atmospheric pressure, but the liquid slugs 20 confined therein will not be permitted to return freely into the tank 16 since the timer 19 will still be functioning, but most of these washing slugs 20 will surge toward the inlet end of the pipeline and will thus enhance the scouring and cleansing action. As the reservoir 31 is being emptied, the float 34 will drop while the valve disk 46 remains open, until the float engages the lower abutment 52 whereupon the weight of the float will cause the rod 40 to drop and to subsequently open the vacuum port 45 and to close the air valve disk 46, thus placing the installation in condition for repetition of the washing cycle. With the apparatus properly initially conditioned and adjusted, the cleansing and sterilizing cycle will be repeated automatically as long as the timer 19 is functioning and the vacuum connection 50 is communicating with the source of vacuum.

From the foregoing detailed description of the construction and operation of a commercial installation, it should be apparent that the present invention in fact provides an improved method of effecting thorough cleansing of long pipelines with the aid of limited quantities of washing liquid and water used in producing such liquid. The method can obviously be exploited with simple and automatically functioning apparatus which requires no attention after being initially properly conditioned and adjusted, and the timer plug valve 22 and check valve 33 cooperate with the vacuum and air inlet valves 39, 46 to produce an effective scouring and cleansing action within the pipeline 12. The improved vacuum control valve is also of utmost simplicity and dependability and causes the slugs 20 to reciprocate as they proceed through the pipeline and to thereby produce a thorough scrubbing action on the interior of the entire pipeline, and this improved method and apparatus have proven highly satisfactory and successful in actual use. It is also noteworthy that whenever the timer valve plug 22 is closed, it provides an air lock for preventing the liquid slugs 20 from returning directly from the pipeline 12 to the tank 16 without passing through the unit 31.

Various modes of carrying out the invention are contemplated as being within the scope of the following claims particularly pointing out and distinctly claiming the subject matter which is regarded as the invention:

1. A milk pipeline washer, comprising a reservoir having its lower portion in open communication with an end end of the pipeline and also having said portion provided with a liquid exhaust conduit, an upright rod longitudinally reciprocable within said reservoir and having vertically spaced abutments thereon, a float movable along said rod and being cooperable with said rod abutments to reciprocate the rod, a piston secured to the upper rod end, a vertically reciprocable sleeve within which said piston is movable and having an air exhaust port adapted to connect the reservoir interior with a source of vacuum, a valve disk secured on said sleeve and operable when raised to connect said reservoir with the ambient atmosphere, and a pin carried by said rod and being engageable with said sleeve, said rod being movable upwardly initially by said float to cause said piston to initially seal said port, said source of vacuum then acting in said sleeve and on said piston to cause said rod and its pin to raise said sleeve and thereby open said valve disk.

2. A milk pipeline washer, comprising, a reservoir in open communication with the pipeline and having a liquid outlet, an upright rod reciprocable within said reservoir and having a valve piston near its upper end and spaced abutments below said piston, a float movable along said rod and being cooperable with said abutments to reciprocate said piston, a reciprocable sleeve having therein a port adapted to connect said reservoir with a source of vacuum, said piston being reciprocable in said sleeve to seal said port, a valve disk carried by said sleeve and being operable when raised by the sleeve to connect said reservoir with the ambient atmosphere, and means carried by said rod for engaging and raising said sleeve to place said valve disk into open position to cause liquid to escape from said reservoir through said outlet while said port is sealed by said piston.

3. A milk pipeline washer, comprising, a reservoir in open communication at its lower end with the pipeline and having a bottom liquid outlet, an upright rod longitudinally reciprocable within said reservoir and a valve piston secured to its upper end and also having spaced abutments beneath said piston, a float movable along said rod between said abutments and being cooperable therewith to reciprocate said piston, a reciprocable sleeve having therein a port adapted to connect said reservoir with a source of vacuum, said piston being reciprocable in said sleeve to seal said port, a valve disk carried by the exterior of said sleeve and opened by raising of the sleeve to connect said reservoir with the ambient atmosphere, and an abutment pin carried by said rod above said spaced abutments for raising said sleeve to place said valve disk into open position to cause liquid to escape from said reservoir through said outlet while said port is sealed by said piston.

4. A milk pipeline washer, comprising, a reservoir communicable with the pipeline and having a lower outlet provided with a check valve, an upright rod reciprocable within the reservoir and having a valve piston at its upper end, a float movable along said rod and being cooperable therewith to reciprocate said piston, a reciprocable sleeve within which said piston is movable and having therein a port which is adapted to connect the reservoir interior with a vacuum source but is sealable by the piston, when the latter is raised, a valve carried by said sleeve for admitting atmospheric air into the reservoir whenever said piston seals said vacuum port, and means associated with said rod for moving said sleeve to open said valve and to cause liquid to escape through said outlet whenever said port is sealed.

References Cited in the file of this patent
UNITED STATES PATENTS

| | | |
|---|---|---|
| 2,625,133 | Hein | Jan. 13, 1953 |
| 2,897,828 | Bender | Aug. 14, 1959 |

UNITED STATES PATENT OFFICE
CERTIFICATE OF CORRECTION

Patent No. 3,139,107                                           June 30, 1964

Lloyd F. Bender

It is hereby certified that error appears in the above numbered patent requiring correction and that the said Letters Patent should read as corrected below.

In the heading to the printed specification, line 5, for "Filed Apr. 24, 1963, Ser. No. 275,333" read -- Original application Jan. 4, 1962, Ser. No. 164,335, now Patent No. 3,119,399, dated Jan. 28, 1964. Divided and this application Apr. 24, 1963, Ser. No. 275,333 --; column 1, line 12, after "such installations." insert the following as a new paragraph:

> This is a divisional application of U.S. Serial No. 164,335, filed January 4, 1962, which issued as Patent No. 3,119,399 on January 28, 1964.

Signed and sealed this 6th day of April 1965.

(SEAL)
Attest:

ERNEST W. SWIDER                                        EDWARD J. BRENNER
Attesting Officer                                         Commissioner of Patents